United States Patent
Bar-El et al.

(10) Patent No.: US 8,533,397 B2
(45) Date of Patent: Sep. 10, 2013

(54) IMPROVING PERFORMANCE IN A CACHE MECHANISM BY WAY OF DESTAGING DATA IN PARTIAL STRIDES

(75) Inventors: Gitit Bar-El, Haifa (IL); Shachar Fienblit, Ein Ayala (IL); Aviad Zlotnick, Netofah (IL)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 12/348,995

(22) Filed: Jan. 6, 2009

(65) Prior Publication Data
US 2010/0174864 A1    Jul. 8, 2010

(51) Int. Cl.
*G06F 13/00*    (2006.01)

(52) U.S. Cl.
USPC ............ 711/135; 711/E12.103; 711/E12.026; 711/5

(58) Field of Classification Search
None
See application file for complete search history.

(56) References Cited

U.S. PATENT DOCUMENTS

| | | | |
|---|---|---|---|
| 8,055,938 B1* | 11/2011 | Chatterjee et al. | 714/6.24 |
| 2002/0004885 A1 | 1/2002 | Francis et al. | |
| 2002/0161972 A1* | 10/2002 | Talagala et al. | 711/114 |
| 2003/0237019 A1* | 12/2003 | Kleiman et al. | 714/6 |
| 2005/0149678 A1* | 7/2005 | Stolowitz | 711/114 |
| 2006/0085471 A1* | 4/2006 | Rajan et al. | 707/102 |
| 2008/0065827 A1* | 3/2008 | Byrne et al. | 711/114 |
| 2008/0126734 A1* | 5/2008 | Murase | 711/170 |
| 2010/0146039 A1* | 6/2010 | Lo et al. | 709/203 |

* cited by examiner

*Primary Examiner* — Edward Dudek, Jr.
*Assistant Examiner* — Sean D Rossiter
(74) *Attorney, Agent, or Firm* — Century IP Group, Inc.; F. Jason Far-hadian, Esq.

(57) ABSTRACT

A method for improving performance in a storage system is provided. The method comprises receiving a request to destage a partial stride of data from a storage cache; reserving space for a full stride of data on one or more storage devices; allocating the partial stride of data to the reserved space; adding padding for unallocated blocks, wherein the unallocated blocks are reserved for future updates; and destaging the full stride of data to the storage devices, wherein the full stride of data comprises the allocated partial stride of data and the padded unallocated blocks.

12 Claims, 4 Drawing Sheets

IMPROVING PERFORMANCE IN A CACHE MECHANISM BY WAY OF DESTAGING DATA IN PARTIAL STRIDES

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data storage systems and, more particularly, to a system and method for improving performance in a data storage system.

BACKGROUND

A data storage system may be implemented according to a storage technology referred to as the redundant array of independent disks (RAID). A RAID system includes one or more disk drives and an array controller connected to one or more computing systems. When several physical disks are set up to use RAID technology, the disks are said to be in a RAID array. This array distributes data across several disks, but the array is seen by the computer user and operating system as one single disk.

In some RAID implementations, data in conjunction with meta data (i.e., additional data used to validate the actual data) may be interleaved across a plurality of blocks on the disk drives. A concurrent series of blocks (one on each of the disks in an array) is collectively called a stride. Each stride of data is typically written across a plurality of disk drives in a single operation. This implementation generally improves data recovery and system efficiency, in case one of the disk drives fails or if data stored on one of the disk drives is corrupted.

The storage system may also include a storage cache that provides faster access to frequently or recently accessed data. Because space is limited in the storage cache, a storage cache controller may destage existing data from the storage cache to make room for new data that are to be copied to the cache according to a caching algorithm. Destaging refers to identifying data in the storage cache (e.g., by setting a corresponding dirty bit) to indicate that the data can be removed from the cache (e.g., after the data is written to the disk drives, or if it is determined that the cached data has not been updated since it was read from the disk drives).

In a RAID architecture, it is desirable to destage data from the cache in full strides because partial destaging of data in a stride is inefficient as it minimizes the amount of data that can be sequentially destaged from the cache. Full stride destaging is only possible when an entire stride is available in the storage cache. If the entire stride is not available, the storage cache controller may either wait for the entire stride to become available or alternatively destage a partial stride. Such an implementation is undesirable.

Systems and methods are needed that can overcome the above-noted shortcomings.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for improving performance in a storage system is provided. The method comprises receiving a request to destage a partial stride of data from a storage cache; reserving space for a full stride of data on one or more storage devices; allocating the partial stride of data to the reserved space; padding unallocated blocks, wherein the unallocated blocks are reserved for future updates; and destaging the full stride of data to the storage devices, wherein the full stride of data comprises the allocated partial stride of data and the padded unallocated blocks.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
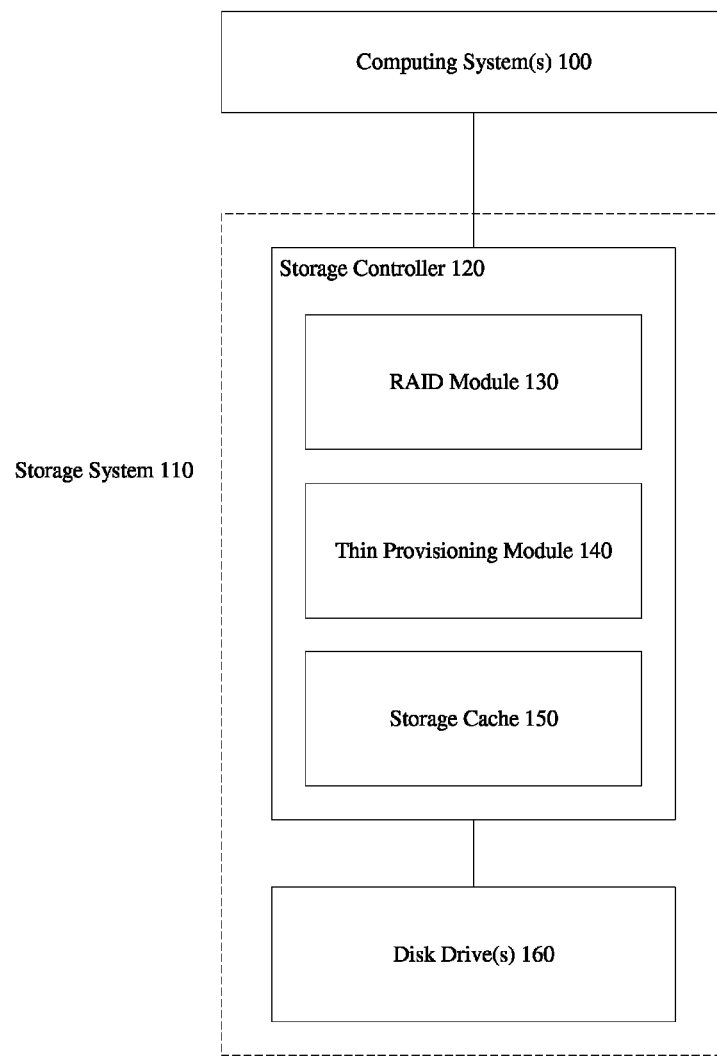
FIG. 1 is a block diagram of an exemplary data storage environment, in accordance with one embodiment.

Referring to FIG. 1, in accordance with one embodiment, an exemplary data storage environment comprises one or more computing systems 100 connected to a storage system 110 with a storage controller 120 and one or more disk drives 160. Storage controller 120 may comprises a read/write module (hereafter referred to as RAID module 130 by way of example), a provisioning module (hereafter referred to as a thin provisioning module 140 by way of example), and a storage cache 150. RAID module 130 is configured to write data across disk drives 160 in strides in conjunction with metadata (e.g., parity bits). Thin provisioning module 140 maps data blocks on a virtual data storage address space (e.g., a thin provisioned address space) to a physical data storage address space (e.g., data blocks on disk drives 160). Storage cache 150 is configured to provide faster access to frequently or recently accessed data.

In some implementations, storage controller 120 may manage the disk drives 160 in conjunction with thin provisioning module 140. Thin provisioning module 140 may use an over-allocation scheme to allocate space on a just-enough and just-in-time basis. Over-allocation allows a storage system 110 to allocate more space to a computing system than is physically reserved or available on the disk drives 160. For example, when a computing system 100 or an application executed on the computing system 100 requests storage space to be allocated for certain operations, the storage system 110 allocates the requested space on a thin provisioned, or virtual, address space. Space on the disk drives 160 may not be allocated until data is actually accessed (e.g., read or written).

Thin provisioning module 140 thus may help avoid partial stride destaging by grouping data that is not sequential on the thin provisioned address space into a full stride on the disk drives 160. To avoid performance degradation for later sequential reads from the thin provisioned address space, a background task may be implemented to re-arrange the data sequentially. The following actions may be implemented to avoid any complexity associated with the background task and a negative impact on system performance.

Figure 2:
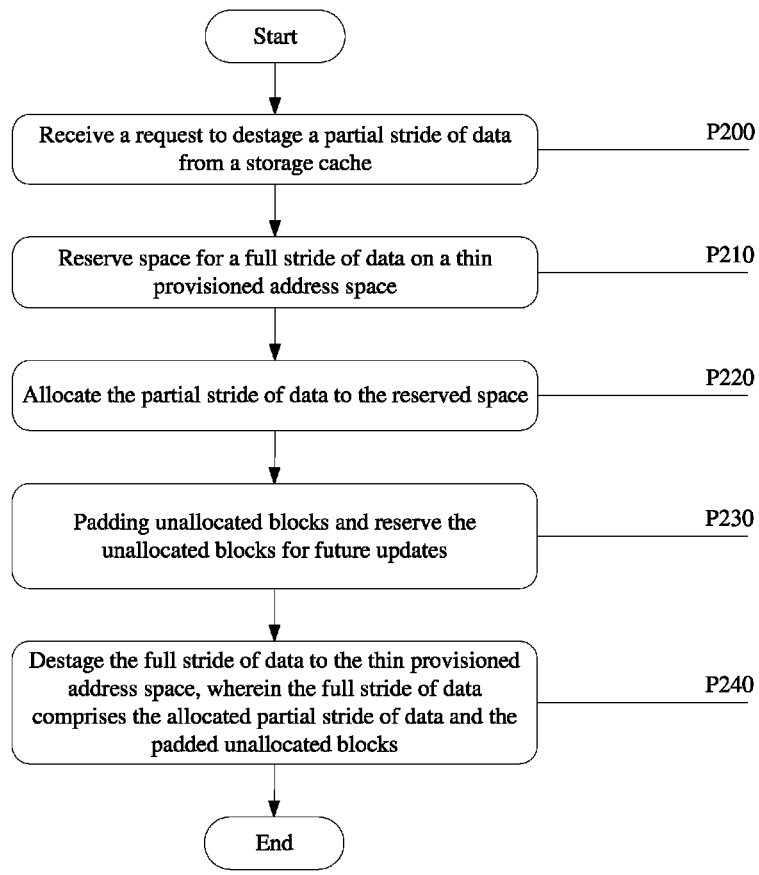
FIG. 2 is a flow diagram of a method for improving RAID performance in a storage system, in accordance with one embodiment.

Referring to FIG. 2, in accordance with one embodiment, in response to receiving a request to destage a partial stride of data from storage cache 150 (P200), storage controller 120 reserves space for a full stride of data on a thin provisioned address space (P210). The partial stride of data is allocated to the reserved space (P220). Unallocated blocks are padded (e.g., with zeroes) and the unallocated blocks are reserved for future data updates (P230). Upon padding the unallocated blocks, a full stride of data, comprising the allocated partial stride of data and the padded unallocated blocks, is destaged to the thin provisioned address space (P240). Depending on implementation, RAID module 130 may calculate parity bits prior to destaging the full stride.

Advantageously, sequential data may be grouped together on the thin provisioned address space, improving performance during later sequential reads. In addition, calculating the parity bits for the full stride prior to padding the unallocated blocks with zeros allows the parity bits to be written directly to the thin provisioned address space without first being written to storage cache 150.

In different embodiments, the disclosed systems and methods may be implemented either entirely in the form of hardware or entirely in the form of software, or a combination of both hardware and software elements. For example, computing systems 100 and storage system 110 may comprise a controlled computing system environment that may be presented largely in terms of hardware components and software code executed to perform processes that achieve the results contemplated by the system of the present invention.

Figure 3:
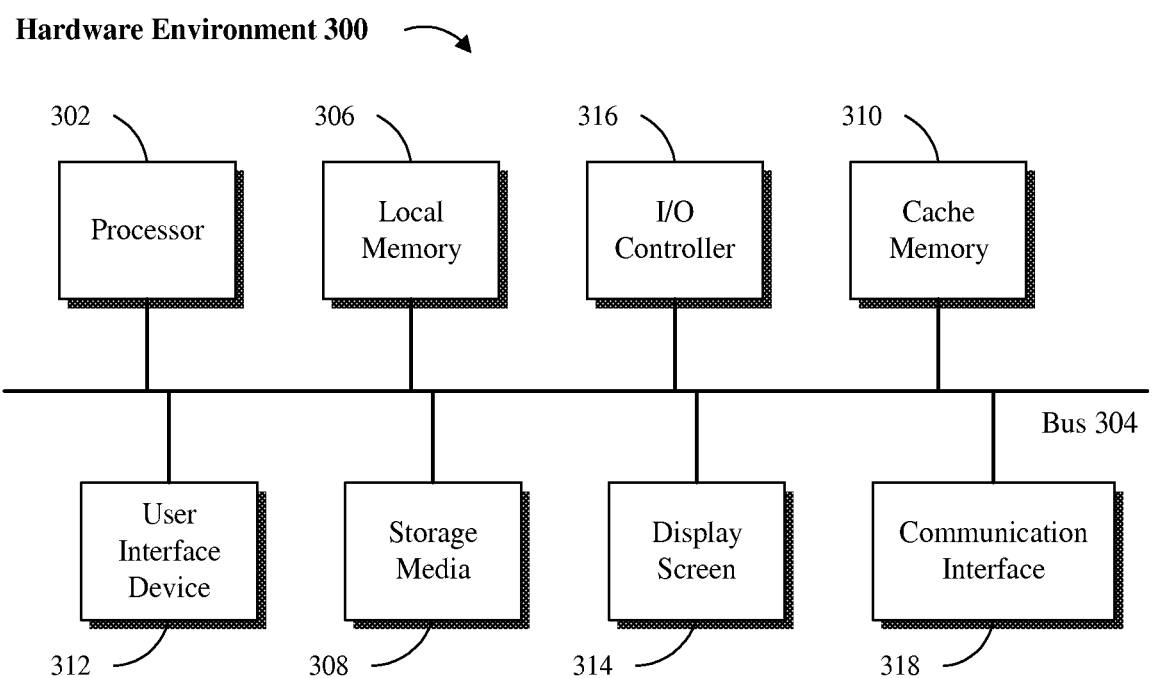
FIGS. 3 and 4 are block diagrams of hardware and software environments in which a system of the present invention may operate, in accordance with one or more embodiments.
Figure 4:
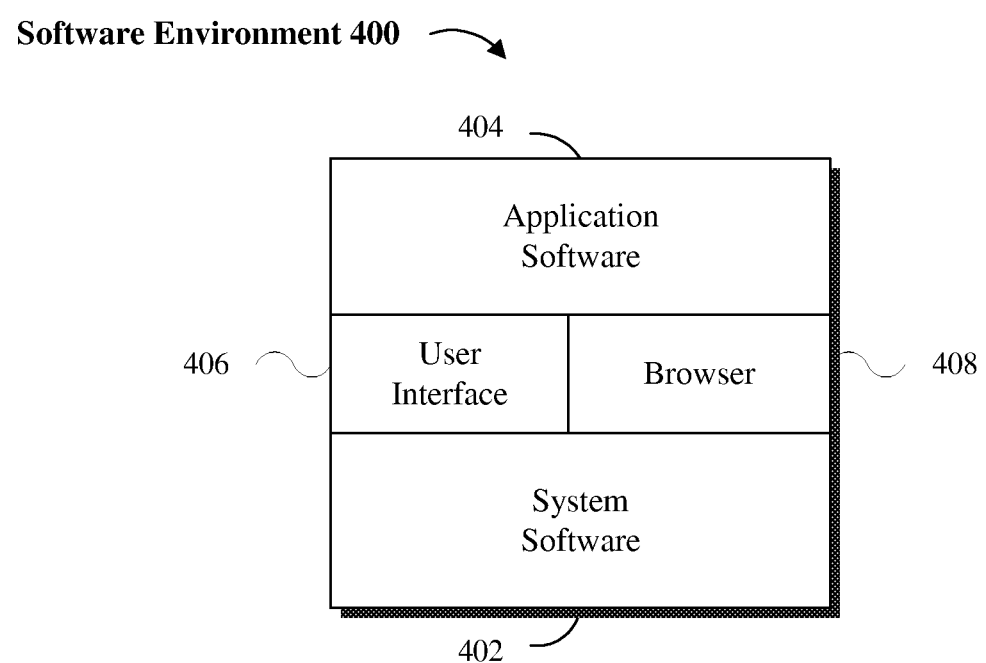

Referring to FIGS. 3 and 4, a computing system environment in accordance with an exemplary embodiment is composed of a hardware environment 300 and a software environment 400. The hardware environment 300 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 400 is divided into two major classes comprising system software 402 and application software 404. System software 402 comprises control programs, such as the operating system (OS) and information management systems that instruct the hardware how to function and process information. Application software 404 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 3, an embodiment of the system software 402 and application software 404 may be implemented as computer software in the form of computer readable code executed on a data processing system such as hardware environment 300 that comprises a processor 302 coupled to one or more computer readable media or memory elements by way of a system bus 304. The computer readable media or the memory elements, for example, can comprise local memory 306, storage media 308, and cache memory 310. Processor 302 loads executable code from storage media 308 to local memory 306. Cache memory 310 provides temporary storage to reduce the number of times code is loaded from storage media 308 for execution.

A user interface device 312 (e.g., keyboard, pointing device, etc.) and a display screen 314 can be coupled to the computing system either directly or through an intervening I/O controller 316, for example. A communication interface unit 318, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 300 may not include all the above components, or may comprise other components for additional functionality or utility. For example, hardware environment 300 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 318 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4, system software 402 and application software 404 may comprise one or more computer programs that are executed on top of an operating system after being loaded from storage media 308 into local memory 306. In a client-server architecture, application software 404 may comprise client software and server software. For example, in one embodiment of the invention, client software or server software is executed on computing systems 100 (not shown).

Software environment 400 may also comprise browser software 408 for accessing data available over local or remote computing networks. Further, software environment 400 may comprise a user interface 406 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method implemented for execution on one or more processors for improving data access performance in a storage system, the method comprising:

receiving a request to destage a first partial stride of data from a storage cache to one or more storage devices, wherein data is stored in the one or more storage devices as a full stride with parity data calculated for the full stride;

reserving space on said one or more storage devices to store a full stride of data;

destaging the first partial stride of data to a first portion of the reserved space on the one or more storage devices by:

allocating the reserved space such that (1) the first portion of the reserved space includes data blocks that are allocated to the requested first partial stride of data and (2) a second portion of the reserved space includes data blocks that remain unallocated; and padding the second portion of the reserved space that includes the unallocated data blocks with binary bits, so that the second portion of the reserved space remains available for destaging of one or more additional partial strides of data from the storage cache during a later data destaging from the cache, wherein the first and second portions of the reserved space correspond to a full stride of data with parity data calculated based on value of the first partial stride of data stored in the first portion of the reserved space and value of the binary bits stored in the second portion of the reserved space, such that the binary bits do not affect value of the parity data calculated for the full stride of data; and delaying calculating the priority value for the data stored in the reserved space, unit the second portion of the reserved space is allocated in a thin provisioned address space when additional data is destaged from the cache into the second portion of the reserved space.

2. The method of claim 1, wherein the binary bits are zeroes.

3. The method of claim 1, further comprising not calculating parity bits prior to destaging the first partial stride from the storage cache.

4. The method of claim 3, where the parity bits are written directly to the thin provisioned address space without first being read into the storage cache.

5. The method of claim 1, wherein sequential data is grouped together on the thin provisioned address space to improve performance during later sequential reads.

6. The method of claim 1, wherein data that is not sequential is grouped together on a same stride on the storage devices.

7. A computer-implemented system for improving data access performance in a storage system, the system comprising:

a logic unit for receiving a request to destage a first partial stride of data from a storage cache to one or more storage devices, wherein data is stored in the one or more storage devices as a full stride with parity data calculated for the full stride;

a logic unit for reserving space on said one or more storage devices to store a full stride of data instead of the first partial stride of data;

a logic unit for destaging the first partial stride of data to a first portion of the reserved space on the one or more storage devices by:

allocating the first partial stride of data to the reserved space such that (1) the first portion of the reserved space includes data blocks that are allocated to the first partial stride of data and (2) a second portion of the reserved space includes data blocks that remain unallocated; and padding the second portion of the reserved space that includes the unallocated data blocks with binary bits, so that the second portion of the reserved space remains available for destaging of one or more additional partial strides of data from the storage cache during a later data, destaging, from the cache wherein the first and second portions of the reserved space correspond to a full stride of data with parity data calculated based on value of the first partial stride of data stored in the first portion of the reserved space and value of the binary bits stored in the second portion of the reserved space, such that tire binary bits do not affect value of the parity data calculated for tire full stride of data; and a logic unit for delaying calculating the parity value for the data stored in the reserved space.

8. The system of claim 7, wherein the binary bits are zeroes.

9. The system of claim 7, further comprising not calculating parity bits prior to destaging the first partial stride from the storage cache.

10. The system of claim 9, where the parity bits are written directly to the thin provisioned address space without first being read into the storage cache.

11. The system of claim 7, wherein sequential data is grouped together on the thin provisioned address space to improve performance during later sequential reads.

12. The system of claim 7, wherein data that is not sequential is grouped together on a same stride on the storage devices.

* * * * *